United States Patent [19]
Jang

[11] Patent Number: 5,658,220
[45] Date of Patent: Aug. 19, 1997

[54] HYDRAULIC CONTROL SYSTEM OF AN AUTOMATIC TRANSMISSION USED IN A VEHICLE

[75] Inventor: Jaeduk Jang, Kyungki-do, Rep. of Korea

[73] Assignee: Hyundai Motor Company, Rep. of Korea

[21] Appl. No.: 556,248

[22] Filed: Nov. 9, 1995

[30] Foreign Application Priority Data

Nov. 9, 1994 [KR] Rep. of Korea .................. 94-29311

[51] Int. Cl.⁶ ........................................... F16H 61/26
[52] U.S. Cl. .................. 477/130; 477/148; 477/158; 477/906
[58] Field of Search ............................ 477/127, 130, 477/136, 143, 148, 158, 906

[56] References Cited

U.S. PATENT DOCUMENTS

| | | | |
|---|---|---|---|
| 4,519,273 | 5/1985 | Shimizu et al. | 477/117 X |
| 4,742,732 | 5/1988 | Hiramatsu | 477/119 |
| 4,903,551 | 2/1990 | Hiramatsu et al. | 477/131 |
| 5,111,717 | 5/1992 | Takeuchi et al. | 477/148 |
| 5,191,815 | 3/1993 | Kouta | 477/906 X |
| 5,383,825 | 1/1995 | El-Khoury et al. | 477/149 |
| 5,417,627 | 5/1995 | Iizuka | 477/143 |
| 5,472,389 | 12/1995 | Ando et al. | 477/906 X |
| 5,521,818 | 5/1996 | Palansky et al. | 477/906 X |
| 5,540,635 | 7/1996 | Jang | 477/135 |
| 5,542,888 | 8/1996 | Takada et al. | 477/130 X |

Primary Examiner—Charles A. Marmor
Assistant Examiner—Peter T. Kwon
Attorney, Agent, or Firm—Finnegan, Henderson, Farabow, Garrett & Dunner, L.L.P.

[57] ABSTRACT

Disclosed is a hydraulic control system of an automatic transmission used in a vehicle, which includes an oil pump, a manual valve for selecting one of the parts of a hydraulic pressure line to deliver the hydraulic pressure produced by the oil pump according to the vehicle speed range, a first to a fourth pressure control valve with a first port to receive the pressure supplied by the manual valve in a forward drive range, a first to a fourth solenoid valve for respectively controlling the pressure control valves according to a vehicle speed, a rear clutch valve for receiving a hydraulic pressure from the pressure control valves, a low/reverse valve, a fail-safe valve, and a high-low pressure valve for receiving a hydraulic pressure from the fourth pressure control valve to vary the line pressure.

3 Claims, 9 Drawing Sheets

HYDRAULIC CONTROL SYSTEM OF AN AUTOMATIC TRANSMISSION USED IN A VEHICLE

BACKGROUND OF THE INVENTION (1) Field of the Invention

The present invention concerns a hydraulic control system of an automatic transmission for a vehicle, and more particularly a hydraulic control system, which employs an independent clutch control for simultaneously controlling the release and the working side of the clutches, and a skip shift mechanism.

(2) Description of Prior Art

The automatic transmission of a vehicle selectively makes the sun gears, ring gears, and planetary gears serve as an input, reaction, or output element to produce different gearshift ratios. The hydraulic control system is used to control the friction elements such as clutches and brakes for selectively connecting or fixing the gears.

Typically, the gear train of a conventional automatic transmission has a structure for providing four forward speeds, which employs an indirect control mechanism, and does not allow the skip shift, so that the responsiveness to the gearshift is delayed as well as occurrence of the shocks caused by the gearshift.

SUMMARY OF THE INVENTION

It is an object of the present invention to provide a hydraulic control system of the automatic transmission, which independently controls the clutches and allows the skip shift to improve the responsiveness to the gearshift.

According to an embodiment of the present invention, a hydraulic control system of an automatic transmission used in a vehicle comprises an oil pump, a manual valve for selecting one of the parts of a hydraulic pressure line to deliver the hydraulic pressure produced by the oil pump according to the vehicle speed range, a first to a fourth pressure control valve with a first port to receive the pressure supplied by the manual valve in a forward drive range, a first to a fourth solenoid valve for respectively controlling the pressure control valves according to a vehicle speed, a rear clutch valve for receiving a hydraulic pressure from the pressure control valves, a low/reverse valve, a fail-safe valve, and a high-low pressure valve for receiving a hydraulic pressure from the fourth pressure control valve to vary the line pressure.

The present invention will now be described with reference to the drawings attached only by way of example.

DETAILED DESCRIPTION OF PREFERRED EMBODIMENTS

Figure 1:
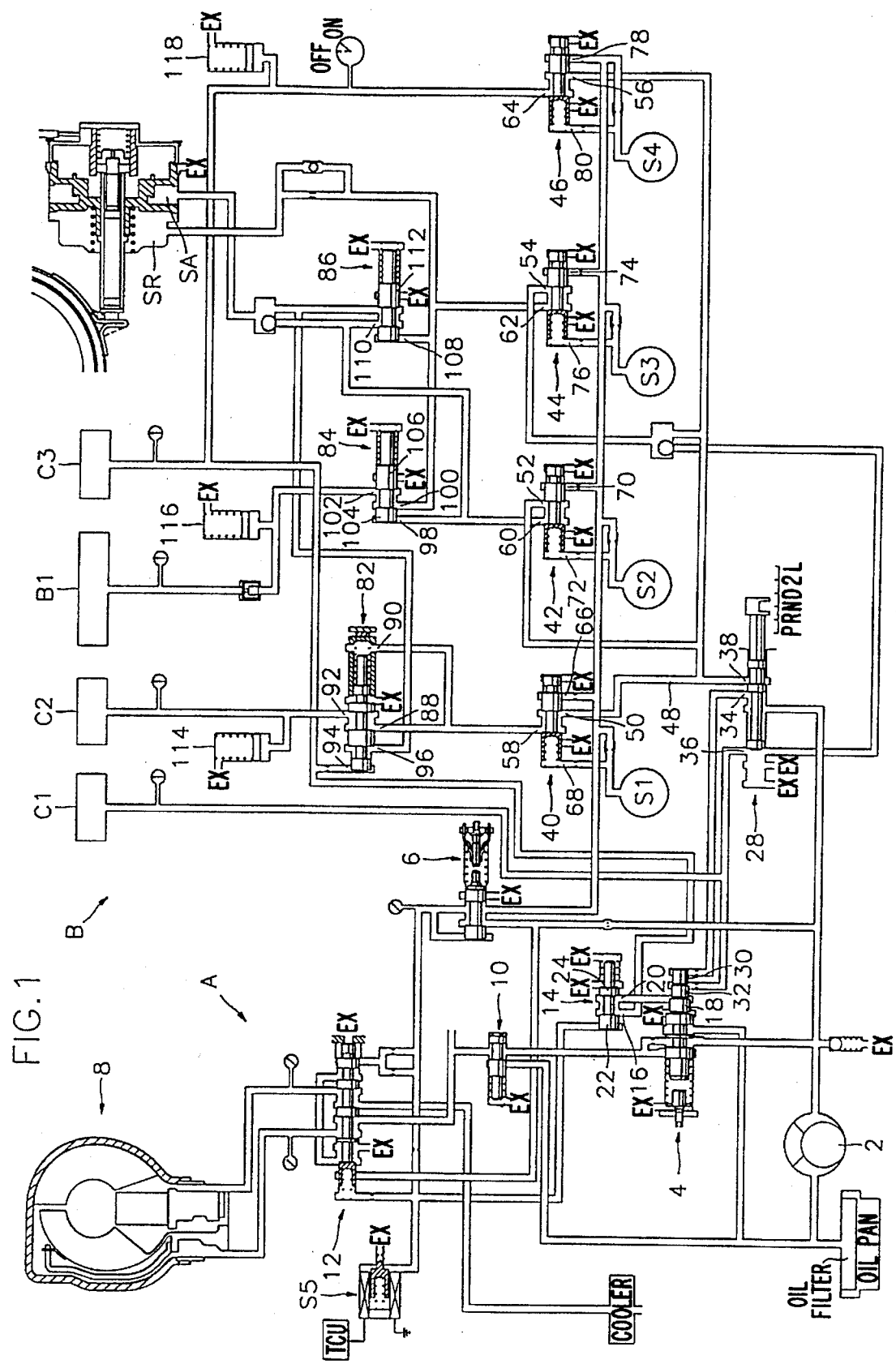
FIG. 1 is a schematic diagram for illustrating the hydraulic pressure line of a hydraulic control system according to an embodiment of the present invention.

Referring to FIG. 1, there are shown an oil pump 2, a regulator valve 4 for regulating the hydraulic pressure produced by the oil pump, a reducing valve 6 for producing a pressure lower than the regulated pressure, a torque converter control valve 10 for controlling the working pressure of the torque converter 8, and a damper clutch control valve 12 for controlling the damper clutch installed in the torque converter 8, which constitutes the line pressure control part A.

The inventive line pressure control part is designed to control the regulator valve 4 by means of the working pressure of the third and fourth speed control, improving the power efficiency. This is achieved by providing a high-low pressure valve 14, which has a first port 16 connected with an end clutch C3, and a second port 20 for applying the pressure of the first port to the third land 18 of the regulator valve 4. The valve spool of the high-low pressure valve 14 has a first land 22 supplied with the pressure of a line part 26 for receiving the control pressure of the damper clutch control valve 12, and a second land 24 resiliently supported by a spring.

Figure 2:
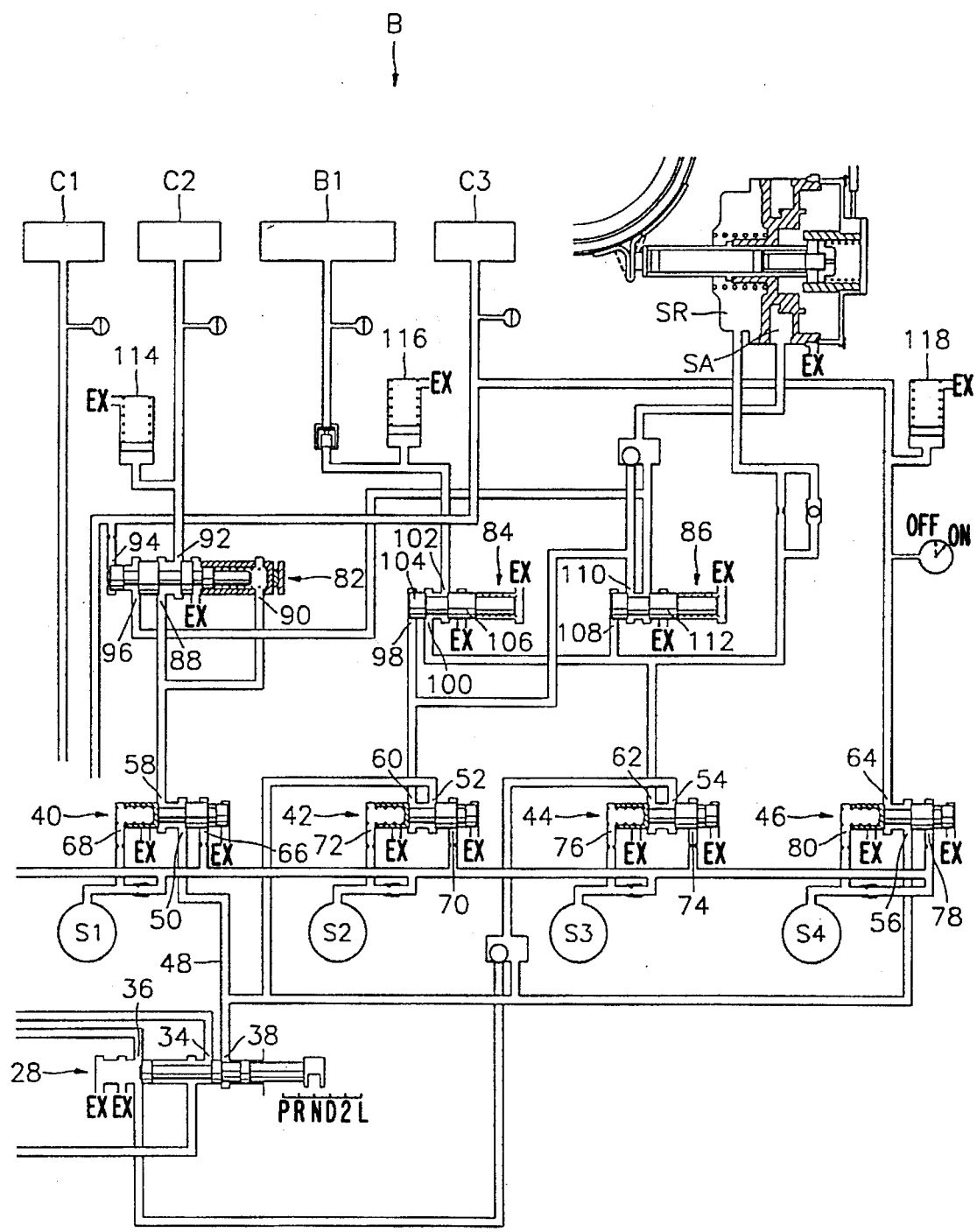
FIG. 2 is a detailed schematic diagram of the shift part of FIG. 1.

The manual valve 28 has two ports 34, 36 for respectively delivering a hydraulic pressure to the first and second lands 30 and 32 of the regulator valve 4. Also provided in the manual valve is a port 38 to transfer the pressure supplied from the oil pump to the shift control part B in the "D" range of a shift lever, which port communicates with the first to the fourth pressure control valve 40, 42, 44, 46, as shown in FIG. 2, which make a port change by working of the first to the fourth normally opened solenoid valve S1, S2, S3, S4 controlled on/off by means of the transmission unit.

The pressure control valves have the same structure, which has a first port 50, 52, 54, 56 communicating with a line part 48, and a second port for discharging the pressure of the first port. Additionally provided in the pressure control valves are ports 66 and 68, 70 and 72, 74 and 76, 78 and 80 designed to receive the reduced pressure from the reducing valve 6. The second port 58, 60, 62, 64 of the pressure control valves is connected with a rear clutch release valve 82, a low/reverse valve 84, a fail-safe valve 86, and a high-low pressure valve 14.

The rear clutch release valve 82 has a first and a second port 88 and 89 for communicating with the second port of the first pressure control valve 40, and a third port 92 for delivering the pressure of the first port 88 to the rear clutch C2. The valve spool of the rear clutch release valve has a structure of four lands with the right end resiliently supported by a spring. The low/reverse valve 84 has a first port 98 communicating with the second port of the second pressure control valve 42 to receive a hydraulic pressure, a second port 100 communicating with the second port 62 of the third pressure control valve 44, and a third port 102 for delivering the pressure of the second port to the low/reverse brake B1, which has a first land 104, and a second land 106 resiliently supported by a spring.

The fail-safe valve 86 has a first port 108 for receiving the pressure of the second port 62 of the third pressure control valve 44, a second port 110 for receiving the pressure of the second port 60 of the second pressure control valve 42, and a third port 112 for delivering the pressure to the fifth port 96 of the rear clutch release valve 82. The pressure of the port 36 of the manual valve 28 is delivered directly to the front clutch C1, and the release side chamber SR of the kick-down servo communicates with the second port 62 of the third pressure control valve 44 receiving the release pressure.

The line parts for supplying the pressure to the rear clutch C2, low/reverse brake B1 and end clutch C3 are respectively provided with accumulators 114, 116, 118 to buffer the shifting shocks.

In operation, all the pressures are discharged through the discharge port Ex of the manual valve 28 in the parking "P" range to release the friction elements such as clutches and brakes. Positioning the shift lever to the forward drive range D, the transmission control unit turns the first solenoid valve S1 off to achieve the first speed control. Then, the oil pump 2 supplies the pressure through the ports 34, 38 of the manual valve 28 to the first land 30 of the regulator valve 4 and the first ports 50, 52, 54, 56 of the pressure control valves 40, 42, 44, 46. In this case, the valve spool of the first pressure control valve 40 is moved to the right side, and the valve spools of the other pressure control valves to the left side by the resilient force of the springs, because of the first solenoid valve S1 being turned off.

Figure 3:
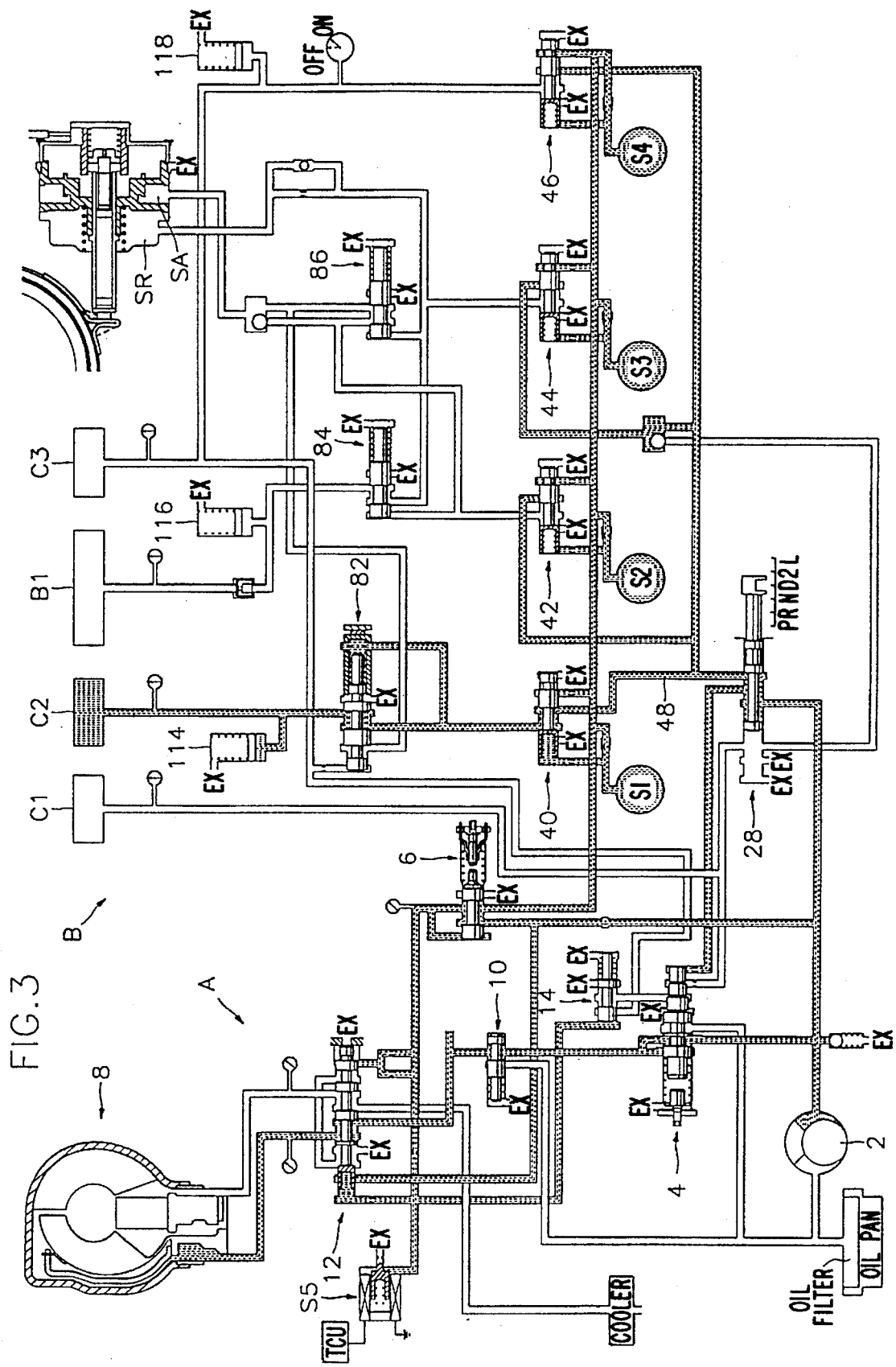
FIG. 3 is a schematic diagram for illustrating the first speed control procedure according to the inventive hydraulic control system.

The first port 50 of the first pressure control valve communicates with the second port 58, so that the pressure of the line part 48 is delivered simultaneously to the first and second ports 88 and 90 of the rear clutch release valve 82, as shown in FIG. 3. Hence, the valve spool of the rear clutch release valve 82 is moved to the left side, and therefore the pressure is discharged through the third port 92 delivered directly to the rear clutch C2, accomplishing the first speed control. The abrupt operation of the rear clutch is prevented by the pressure accumulation of the accumulator 114, making the gearshift smooth.

Figure 4:
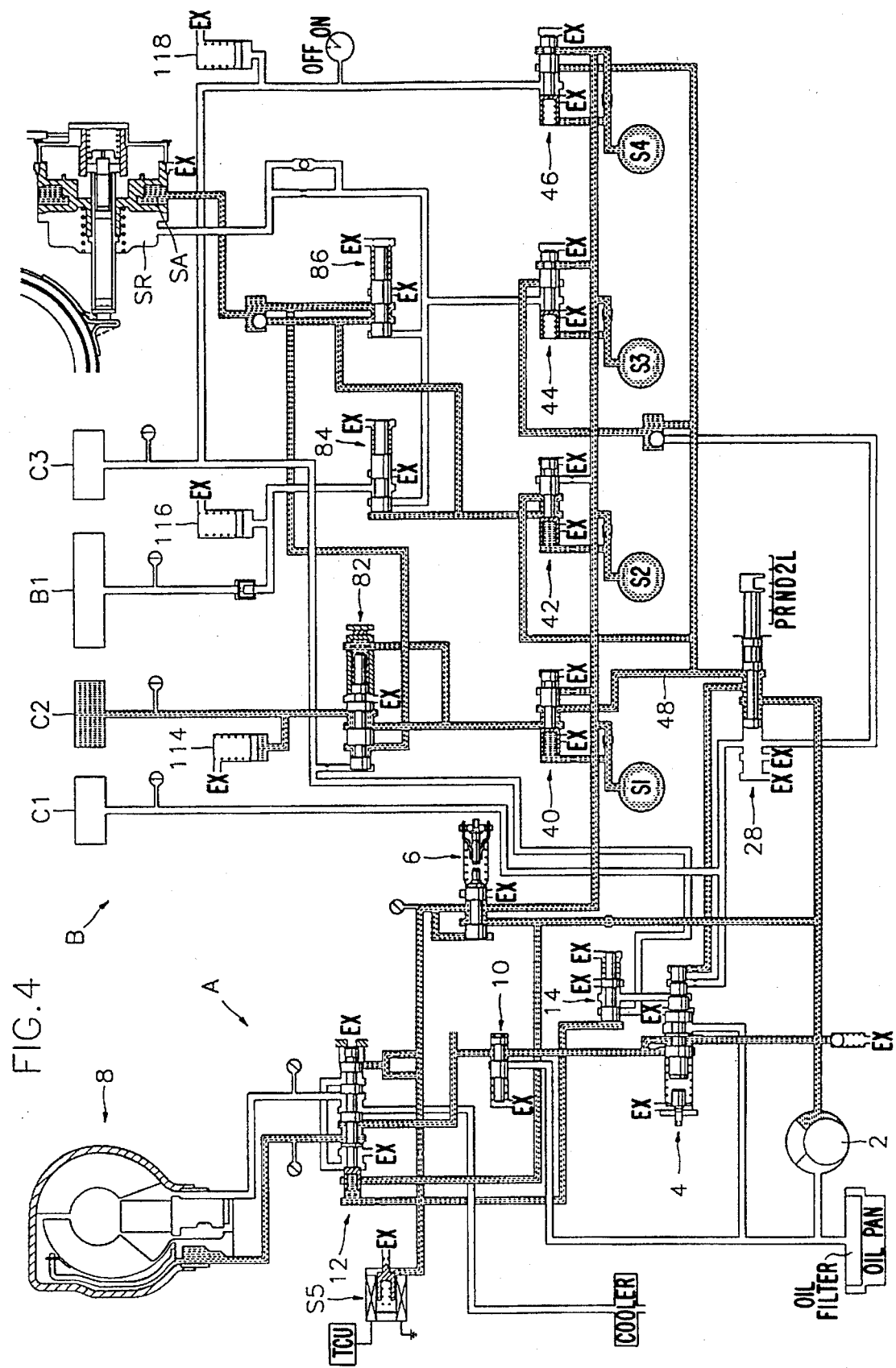
FIG. 4 is a schematic diagram for illustrating the second speed control procedure according to the inventive hydraulic control system.

More increasing the vehicle speed from the first speed, the second solenoid valve S2 is turned off by the transmission control unit, so that the valve spool of the second pressure control valve 42 is moved to the right side to make the pressure of the first port 52 of the second pressure control valve be delivered through the second port 60 to the low/ reverse valve 84 and the working chamber (SA) of the kick-down servo, which cooperates with the rear clutch to accomplish the second speed control. In this case, the pressure delivered to the working chamber of the kick-down servo flows through the ports 110, 112 of the fail-safe valve 86 partly delivered to the fifth port 96 of the rear clutch release valve 82, as shown in FIG. 4.

Figure 5:
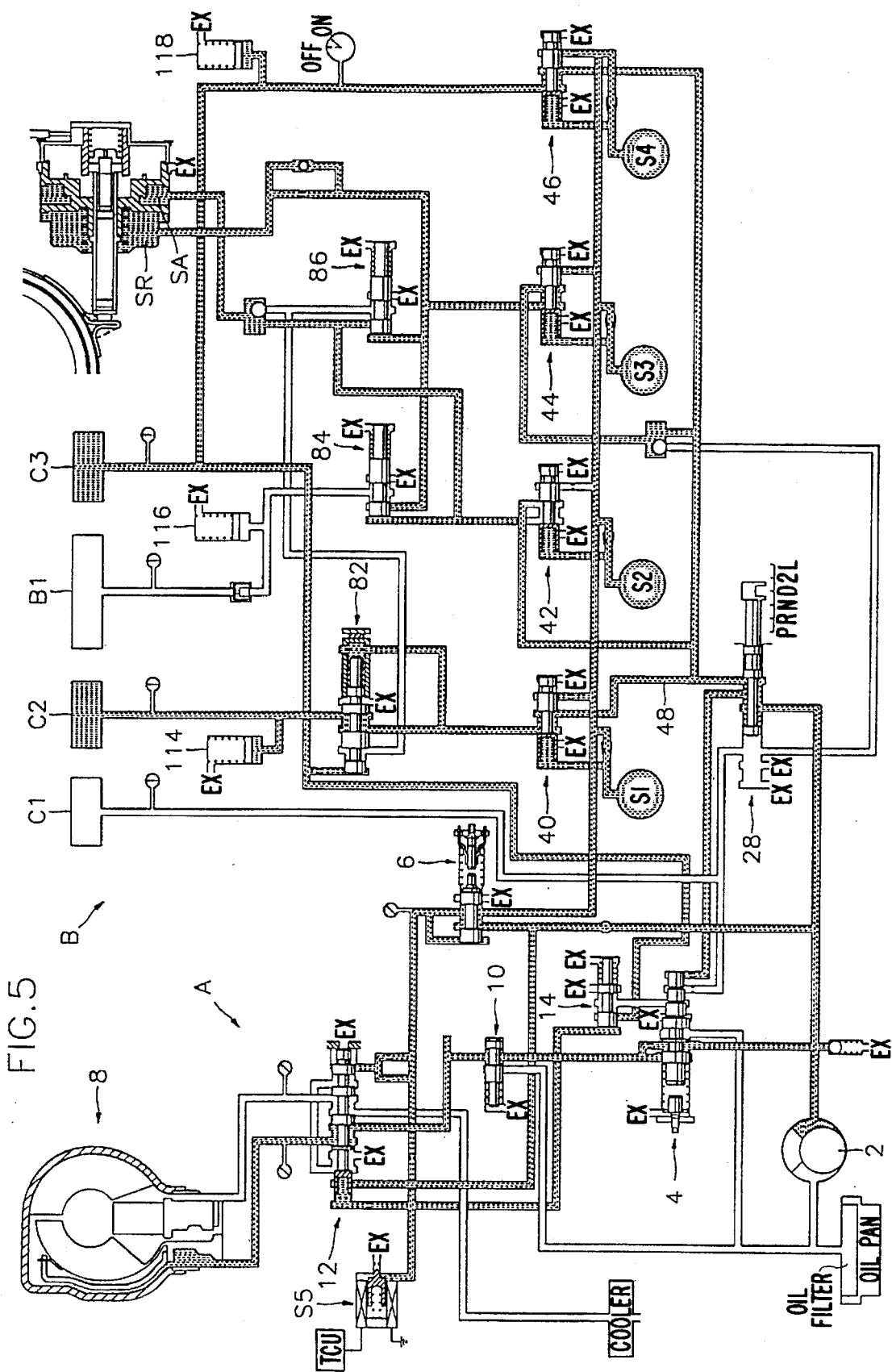
FIG. 5 is a schematic diagram for illustrating the third speed control procedure according to the inventive hydraulic control system.

When the vehicle speed is more increased from the second speed, all the solenoid valves S1, S2, S3, S4 are turned off by the transmission control unit, as shown in FIG. 5. Then, the pressure delivered to the first port 54 of the third pressure control valve 44 is discharged through the second port 62 applied to the port 108 of the fail-safe valve 86, thus moving the valve spool to the right side. Hence, the ports 110 and 113 of the fail-safe valve 86 are blocked to cut off the pressure delivered to the rear clutch release valve 82, and the working chamber (SA) is kept on being supplied with the pressure through the other line parts. However, the release chamber (SR) of the kick-down servo is supplied with the pressure of the third pressure control valve 44, and therefore the operation of the kick-down servo is stopped, while the pressure of the fourth pressure control valve 46 is applied to the end clutch C3 accomplishing the third speed control.

Figure 6:
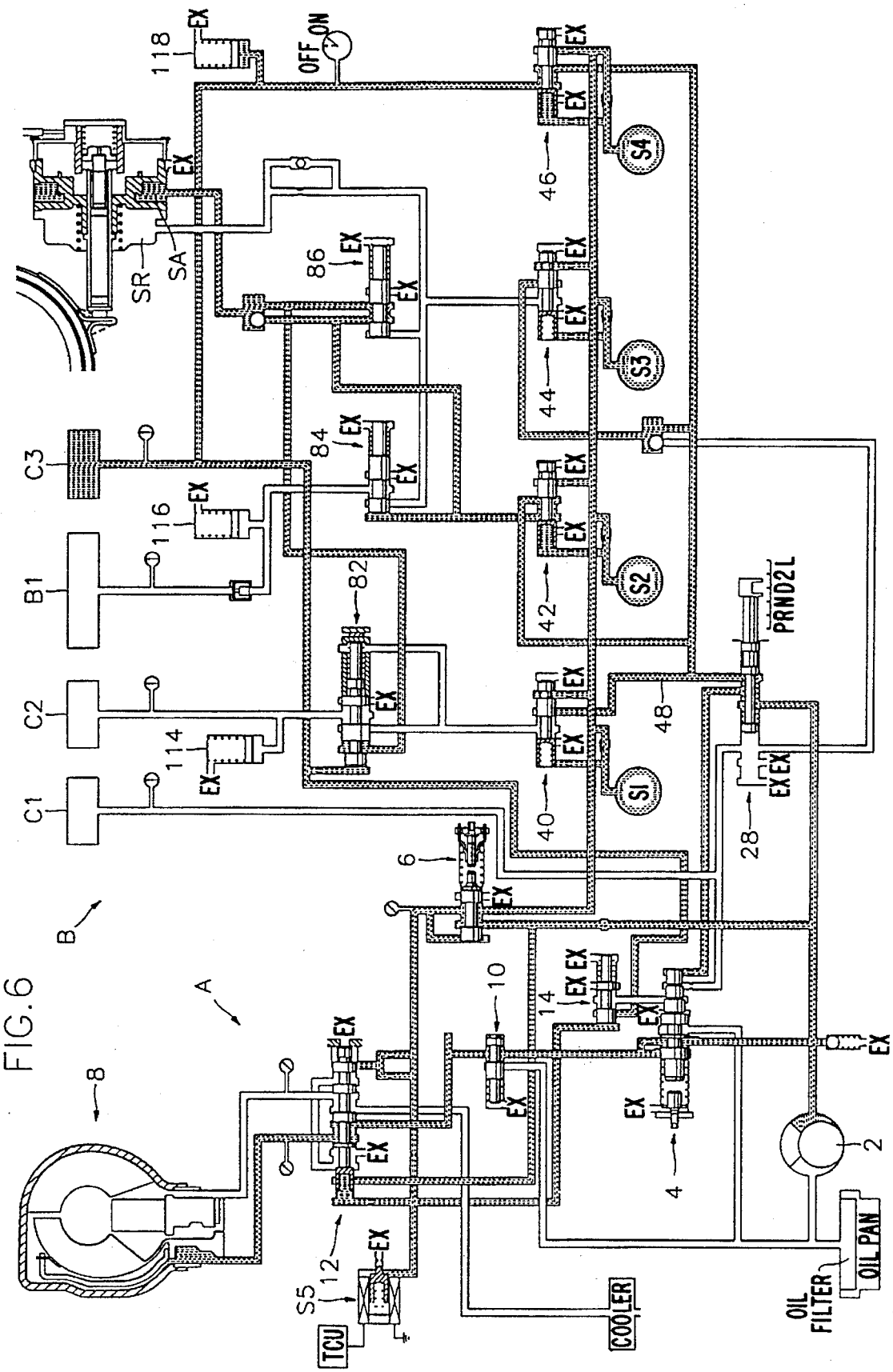
FIG. 6 is a schematic diagram for illustrating the fourth speed control system according to the inventive hydraulic control system.
Figure 7:
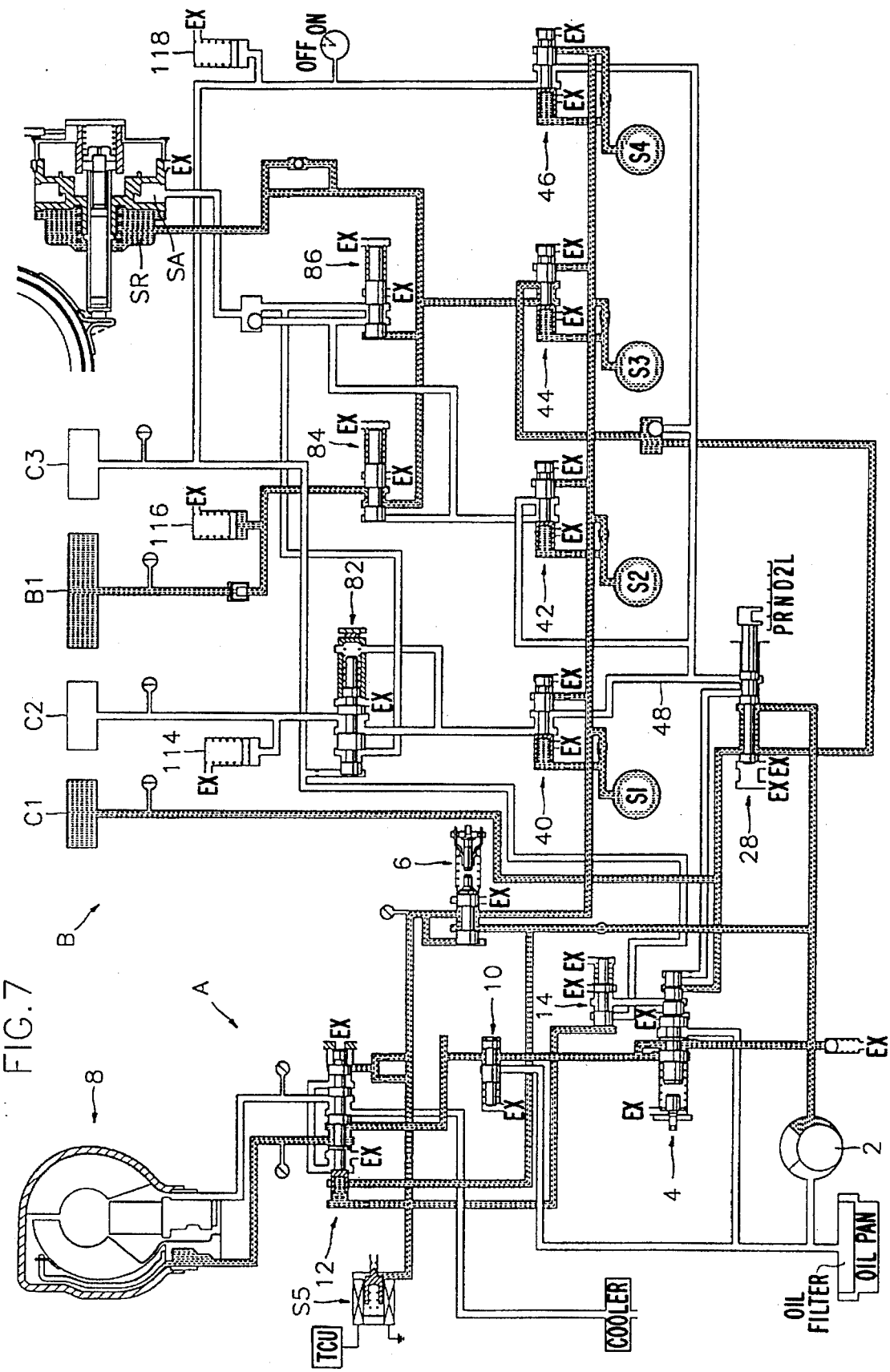
FIG. 7 is a schematic diagram for illustrating the reverse drive control procedure according to the inventive hydraulic control system.

More increasing the vehicle speed for the third speed causes the transmission control unit to turn the second and the fourth solenoid valve S2 and S4 off, so that the end clutch C3 is kept on receiving the pressure to move the valve spool of the third pressure control valve 44 to the left side, thus blocking the first and the second port 84 and 62. Hence, the release chamber of the kick-down servo is stopped to receive the pressure, as shown in FIG. 6. In this way, the kick-down servo works to accomplish the fourth speed control, as shown in FIG. 7.

The pressure of the working chamber of the kick-down servo is delivered to the fifth port 96 of the rear clutch release valve 82 to make the third port 92 communicate with the exit port Ex, thus discharging the working pressure of the rear clutch to secure the safety.

Positioning the shift lever to the reverse drive range R causes only the port 36 of the manual valve 28 to be supplied with the pressure, so that the second land 32 of the regulator valve 14 is supplied with the pressure directly supplying the front clutch C1 with the pressure. The transmission control unit turns the third solenoid valve S3 off, as that the pressure applied to the fist port 54 of the third pressure control valve is transferred via the second port 62 to the working chamber (SA) of the kick-down servo. Thus, the front clutch and kick-down servo are worked in the reverse range.

Figure 8:
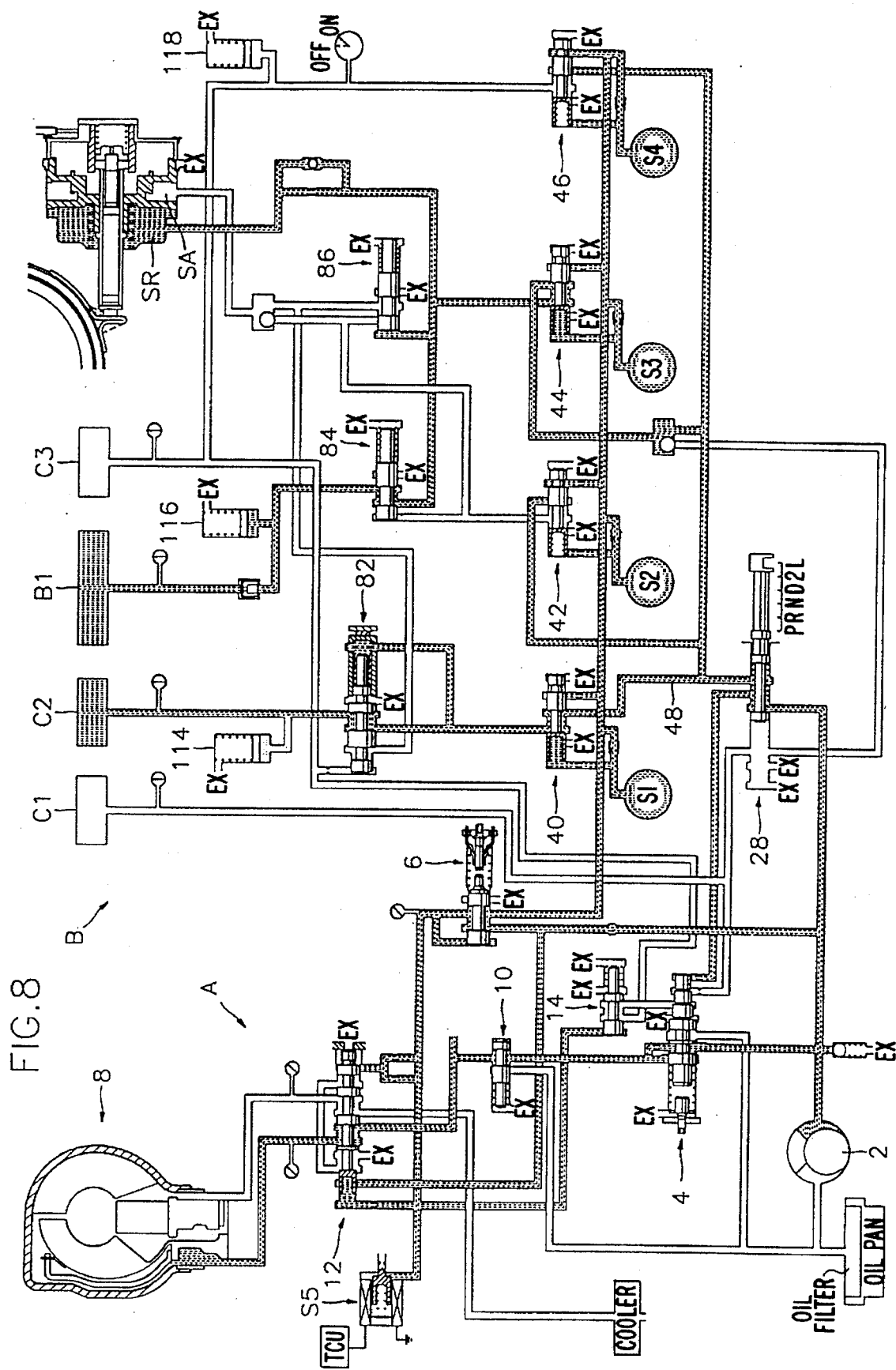
FIG. 8 is a schematic diagram for illustrating the control procedure of "L" range according to the inventive hydraulic control system.

Changing the position of the shift lever to the "L" range causes the transmission control unit to turn the first and the third solenoid valve S1 and S3 off, so that the pressure of the manual valve 28 is directly delivered via the rear clutch release valve 82 to the rear clutch C2, in turn applied through the third pressure control valve 44 and the low/reverse valve 84 to the low/reverse brake B1, as shown in FIG. 8.

Figure 9:
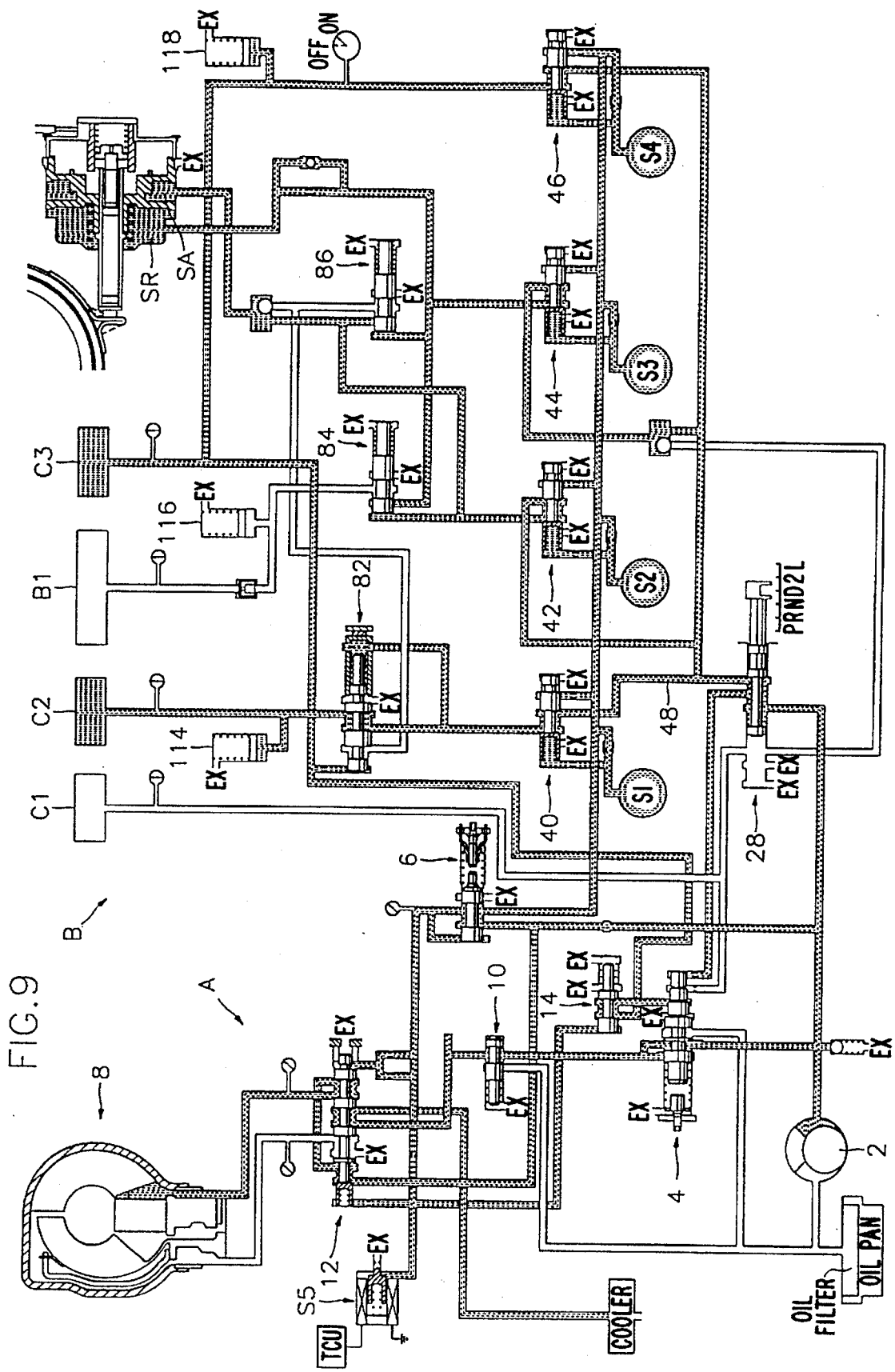
FIG. 9 is a schematic diagram for illustrating the control of the damper clutch and the changing procedure of the line pressure according to the inventive hydraulic control system.

Describing the line pressure change in the third and fourth speeds and the damper clutch with reference to the FIG. 9, the rear and the end clutch C2 and C3 are worked in the third speed, as described with reference to FIG. 5, so that a portion of the pressure supplied to the end clutch is transferred to the first port 16 of the high-low pressure valve 14. Now the solenoid valve is turned on to control the damper clutch control valve discharging the pressure supplied from the reducing valve 6, so that the first land 22 of the high-low pressure valve is released from the pressure moving the valve spool to the left side. Hence, the pressure applied to the first port 16 is delivered via the second port 20 to the third land 18 of the regulator valve 4, so that the valve spool of the regulator valve 4 is moved to the left side releasing the pressure produced by the oil pump to the oil fan. Therefore, the power loss is reduced.

When it is required to make a quick acceleration during a high speed running, the skip shift from the fourth speed to the second speed is accomplished by maintaining the pressure of the working chamber (SA) of the kick-down servo so that the fourth solenoid valve causes the fourth pressure control valve to work to release the end clutch and control the first solenoid valve to deliver the working pressure via the first pressure control valve to the rear clutch.

Thus, the inventive hydraulic control system provides means for simultaneously and independently controlling the release and the working side of the clutch and enabling the skip shift during a high speed running, so that the shift responsiveness is improved. Besides, the line pressure may be varied improving the power efficiency, and the accumulators for the friction elements suppresses the shift shocking impulses providing a smooth shift.

What is claimed is:

1. A hydraulic control system of an automatic transmission used in a vehicle comprising an oil pump, a manual valve for selecting one of the parts of a hydraulic pressure line to deliver the hydraulic pressure produced by said oil pump according to a vehicle speed range, first to fourth pressure control valves, each with a first port to receive the pressure supplied by said manual valve in a forward drive range, first to fourth solenoid valves for respectively controlling said pressure control valves according to a vehicle speed, a rear clutch valve for receiving a hydraulic pressure from said pressure control valves, a low/reverse valve, a fail-safe valve, and a high-low pressure valve for receiving a hydraulic pressure from the fourth pressure control valve to vary the line pressure;

wherein said rear clutch valve provides a pressure to a rear clutch, said low/reverse valve provides a pressure to a low/reverse brake, said fail-safe valve provides a pressure to a working chamber of a kick-down servo, and one of said pressure control valves provides a pressure directly to an end clutch.

2. A hydraulic control system as defined in claim 1, wherein there is provided an accumulator in the pressure supplying line parts of said low/reverse brake and kick-down servo to make the shifting operation smooth.

3. A hydraulic control system as defined in claim 1, wherein the first solenoid valve is turned off to work said rear clutch, the first and second solenoid valves off to work said rear clutch and kick-down servo, the first to the fourth solenoid valve off to work said rear clutch and end clutch, and the second and the fourth solenoid valve off to work said end clutch and kick-down servo.

* * * * *